United States Patent [19]

Holtz

[11] Patent Number: 5,706,319
[45] Date of Patent: Jan. 6, 1998

[54] REACTOR VESSEL SEAL AND METHOD FOR TEMPORARILY SEALING A REACTOR PRESSURE VESSEL FROM THE REFUELING CANAL

[75] Inventor: Michael Holtz, Haddonfield, N.J.

[73] Assignee: Joseph Oat Corporation, Camden, N.J.

[21] Appl. No.: 695,896

[22] Filed: Aug. 12, 1996

[51] Int. Cl.$^6$ .................. G21C 13/06; G21C 19/00
[52] U.S. Cl. .................. 376/203; 376/263; 376/294
[58] Field of Search .................. 376/203, 205, 376/260, 262, 263, 293–296; 976/DIG. 169, DIG. 259

[56] References Cited

U.S. PATENT DOCUMENTS

| Re. 18,472 | 5/1932 | Finn . | |
|---|---|---|---|
| 1,912,271 | 5/1933 | Furino | 405/189 |
| 1,916,294 | 7/1933 | Bacinich | 405/189 |
| 1,948,934 | 2/1934 | O'Rourke | 405/189 |
| 3,141,236 | 7/1964 | Dunne et al. | 29/421.1 |
| 3,285,824 | 11/1966 | Ageron | 376/403 |
| 3,293,136 | 12/1966 | Harris | 376/264 |
| 3,437,558 | 4/1969 | Gunson et al. | 376/264 |
| 3,848,423 | 11/1974 | Renaux | 376/262 |
| 3,922,748 | 12/1975 | Ritz | 15/246.5 |
| 4,138,321 | 2/1979 | Scholz et al. | 376/263 |
| 4,272,321 | 6/1981 | Betancourt et al. | 376/262 |
| 4,666,658 | 5/1987 | Meuschke | 376/263 |
| 4,684,492 | 8/1987 | Kunz et al. | 376/203 |
| 4,696,788 | 9/1987 | Seli | 376/253 |
| 4,758,402 | 7/1988 | Schukei et al. | 376/205 |
| 4,830,814 | 5/1989 | Altman | 376/287 |
| 5,009,836 | 4/1991 | Grimm et al. | 376/260 |
| 5,037,604 | 8/1991 | Bauer et al. | 376/260 |
| 5,170,899 | 12/1992 | Baversten | 212/221 |
| 5,225,150 | 7/1993 | Malandra et al. | 376/263 |
| 5,386,443 | 1/1995 | Baversten et al. | 376/260 |
| 5,400,374 | 3/1995 | Baversten | 376/260 |
| 5,412,700 | 5/1995 | Gillett et al. | 376/263 |
| 5,414,742 | 5/1995 | Hornak et al. | 376/251 |
| 5,426,675 | 6/1995 | Kumar et al. | 376/203 |
| 5,434,894 | 7/1995 | Chiang et al. | 376/203 |

*Primary Examiner*—Michael J. Carone
*Assistant Examiner*—Matthew J. Lattig
*Attorney, Agent, or Firm*—Panitch Schwarze Jacobs & Nadel, P.C.

[57] ABSTRACT

A reactor vessel seal for temporarily sealing a reactor pressure vessel from a water-filled refueling canal above the reactor pressure vessel. The reactor vessel seal is installed in place of the removable reactor pressure vessel closure head for inspecting/servicing the reactor vessel. The reactor seal comprises a seal cap having a surface connected to a flange which is complementary to the upper flange of the reactor pressure vessel. A seal is located between the seal cap flange and the upper flange of the reactor pressure vessel. A lifting rig is connected to the seal cap for lifting the seal cap and placing it in position, with the seal cap flange in alignment with the reactor vessel upper flange, such that the seal located between the seal cap flange and the reactor pressure vessel upper flange is compressed by hydrostatic pressure from water in the water-filled refueling canal acting on the surface of the seal cap as water in the reactor pressure vessel is evacuated.

10 Claims, 3 Drawing Sheets

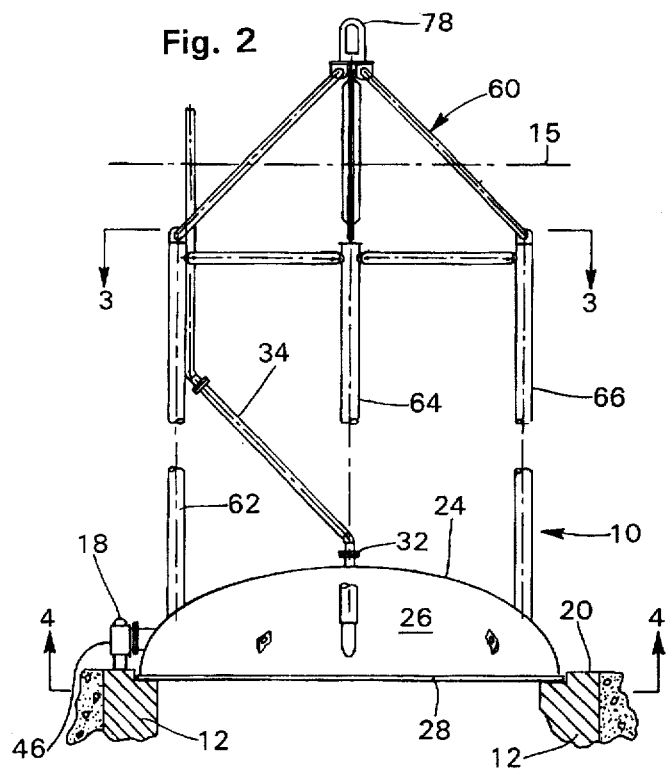
Fig. 2
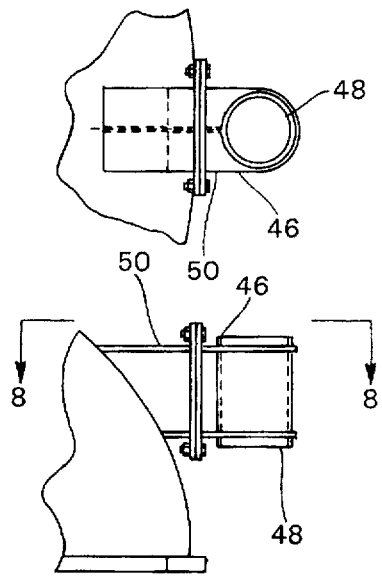
Fig. 8
Fig. 7
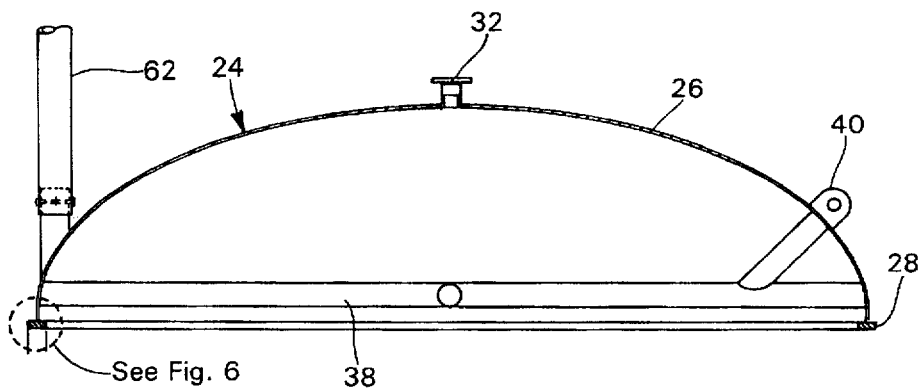
Fig. 5

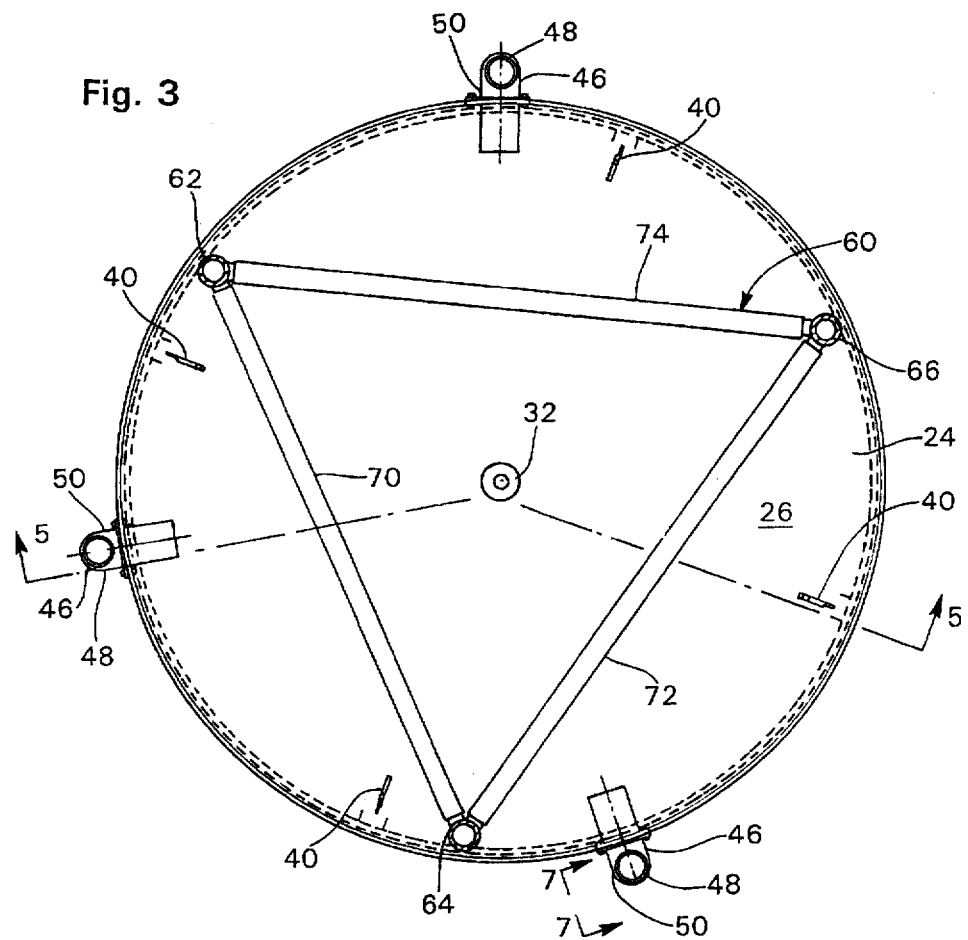
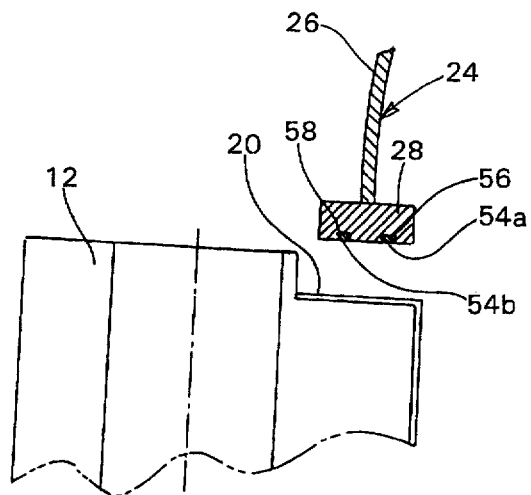
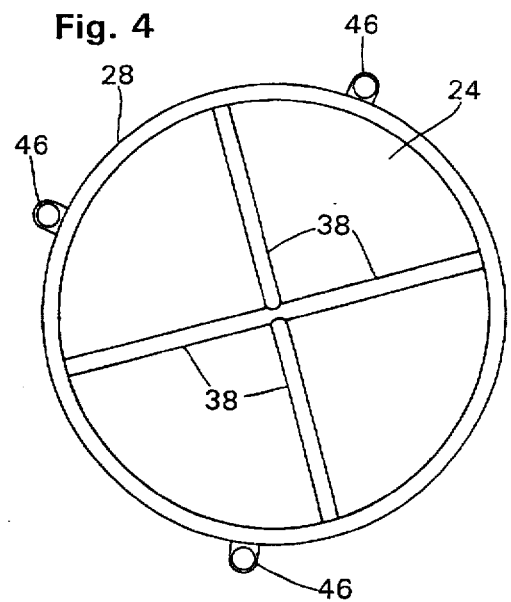

REACTOR VESSEL SEAL AND METHOD FOR TEMPORARILY SEALING A REACTOR PRESSURE VESSEL FROM THE REFUELING CANAL

FIELD OF THE INVENTION

The present invention relates to inspecting and servicing reactor pressure vessels and, more particularly, to a temporary sealing arrangement for the reactor pressure vessel so that it can be drained for inspection and servicing without the need for draining the entire refueling canal above the reactor pressure vessel.

BACKGROUND OF THE INVENTION

Occasionally in the life of a nuclear reactor, the reactor pressure vessel must be evacuated of water for inspection, reactor vessel annealing or other service. To perform such inspections and servicing, the head of the reactor pressure vessel and the internals are removed while the reactor is submerged. Generally, the water level in the reactor cavity is then reduced to below the reactor nozzles, and the water in the reactor vessel is then removed. The internal portion of the reactor vessel is then able to be inspected and serviced, if required.

Reducing the water level in the reactor cavity results in the loss and the eventual makeup of a large volume of water which must be extensively treated. Generally, there is approximately 20 to 25 feet of specially treated water over the reactor vessel which must be removed.

In one known prior art device, in order to avoid the necessity of draining the entire refueling canal, a cylindrical coffer dam assembly, made up of substantially equal segments which are small enough to pass through the equipment hatch of the reactor containment building, are assembled together in sealing relation and attached to the upper flange of the reactor vessel. Water within the coffer dam and the reactor vessel is then evacuated or drained, without the need for removing all of the treated water in the refueling canal. The coffer dam includes a bottom flange which is complimentary to the upper flange of the reactor vessel, and the coffer dam is bolted in place. However, the use of a coffer dam requires correctly aligning the dam with the reactor vessel and bolting it in position. Additionally, the coffer dam must be higher than the height of the water, which requires a large structure possibly 25 feet or more in length having a diameter equal to the diameter of the reactor vessel, which may be 13 feet or greater in diameter.

In another known method for servicing a reactor vessel, a unitary cylindrical coffer dam is seated directly on the bottom of the refueling canal adjacent to the reactor vessel. However, water leakage occurs between the bottom of the coffer dam and the bottom of the refueling canal due to the uneven surface at the bottom of the refueling canal and because the seal relies only on the weight of the coffer dam to create the seal clamp force.

The present invention provides a device and a simpler method for temporarily sealing the top of the reactor vessel from the refueling canal such that the reactor vessel can be drained directly without the need for removing any water from the refueling canal.

SUMMARY OF THE INVENTION

Briefly stated, the present invention provides a reactor vessel seal for temporarily sealing a nuclear reactor pressure vessel from a water-filled refueling canal above the reactor pressure vessel. The reactor pressure vessel includes a removable closure head which is located on the reactor vessel such that it seals against an upper flange of the reactor vessel. The reactor vessel seal is installed in place of the removable closure head for servicing the reactor vessel. The reactor seal comprises a seal cap having a surface connected to a flange which is complimentary to the upper flange of the reactor pressure vessel. A seal is located between the seal cap flange and the upper flange of the reactor pressure vessel. A lifting rig is connected to the seal cap for lifting the seal cap and placing it in position, with the seal cap flange in alignment with the reactor pressure vessel upper flange, such that the seal located between the seal cap flange and the reactor vessel upper flange is compressed by hydrostatic pressure from water in the water-filled refueling canal acting on the surface of the seal cap as water in the reactor pressure vessel is evacuated.

In another aspect, the present invention provides a method of servicing a reactor pressure vessel located beneath a water-filled refueling canal without draining water from the refueling canal. The method comprises the steps of:

unbolting a removable closure head from an upper flange of the reactor pressure vessel and removing the removable closure head;

lowering a reactor vessel seal having a complementary flange to the upper flange of the closure head into a position in alignment with the upper flange of the reactor pressure vessel;

guiding the reactor vessel seal into position on the upper flange;

removing water from the reactor pressure vessel;

compressing a seal located between the reactor vessel seal flange and the upper flange of the reactor pressure vessel by hydrostatic pressure from water in the refueling canal; and servicing the reactor pressure vessel.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 2 is an enlarged front elevational view of a reactor vessel seal in accordance with the present invention;

FIG. 3 is a top view taken along line 3—3 in FIG. 2;

FIG. 4 is a bottom view taken along line 4—4 in FIG. 2;

FIG. 5 is a cross-sectional view taken along line 5—5 in FIG. 3;

FIG. 6 is an enlarged detail of the reactor vessel seal flange as indicated in FIG. 5;

FIG. 7 is a greatly enlarged side elevation view taken along line 7—7 in FIG. 3; and FIG. 8 is a partial top view taken along line 8—8 in FIG. 7.

DETAILED DESCRIPTION OF THE PREFERRED EMBODIMENT

Figure 1:
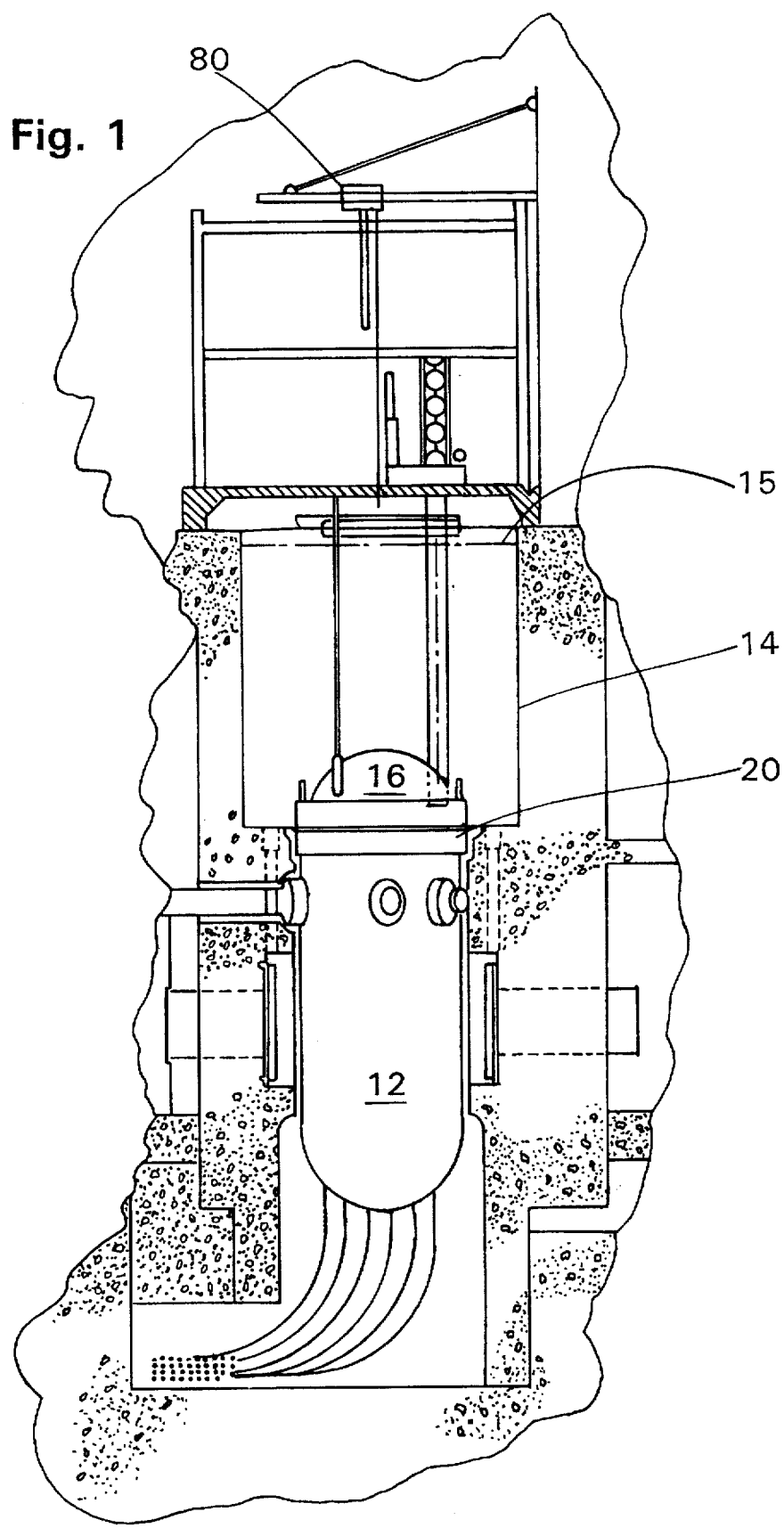
FIG. 1 is an elevational view, partially in cross section, of a reactor pressure vessel in position in a containment building.

Certain terminology is used in the following description for convenience only and is not limiting. The words "right,"

"left," "lower" and "upper" designate directions in the drawings to which reference is made. The words "inwardly" and "outwardly" refer to directions toward and away from, respectively, the geometric center of the reactor vessel seal and designated parts thereof. The terminology includes the words above specifically mentioned, derivatives thereof and words of similar import.

Referring to the drawings, wherein like numerals indicate like elements throughout, there is shown in FIGS. 2–8, a reactor vessel seal 10 in accordance with the present invention. The reactor vessel seal is used in a nuclear power plant when there is a need to drain the reactor vessel 12, shown in FIG. 1, during an outage. The reactor vessel seal 10 is used for temporarily sealing the reactor pressure vessel 12 from water in a water-filled refueling canal 14 located above the reactor pressure vessel 12. The reactor pressure vessel 12 includes a removable closure head 16 which is aligned by guide pins 18 on the reactor pressure vessel 12 such that it is located properly and seals against an upper flange 20 of the reactor vessel 12. During refueling operations, there is approximately 25 feet of water 15 located above the reactor vessel 12 which acts as a radiation shield.

Referring to FIG. 2, the reactor vessel seal 10 is shown in detail. The reactor vessel seal 10 is installed in place of the removable closure head 16 for servicing the reactor vessel 12. The reactor vessel seal 10 comprises a seal cap 24 having a domed surface 26 connected around its periphery to a flange 28. The reactor vessel seal flange 28 is complementary in size and form to the upper flange 20 of the reactor pressure vessel 12.

In the preferred embodiment, the domed surface portion 26 of the seal cap 24 is made of one-inch thick stainless steel and the flange is approximately 1⅜ inches thick and 7 inches wide. It will be recognized by those skilled in the art from the present disclosure that other suitable materials may be used, if desired, and that the size of the seal cap will vary based upon the size of the reactor pressure vessel.

Preferably, a vent 32 is connected to the top of the domed surface 26. However, it will be recognized by those skilled in the art from the present disclosure that the vent can be located in any suitable position. However, the location of the vent should be at the highest enclosed area of the seal cap 24 so that trapped air is vented as the seal cap 24 is lowered into position on the reactor pressure vessel 12. Preferably, a vent tube 34 is attached to the vent 32, and the vent tube 34 extends above the water 15 in the water-filled refueling canal 14. The vent-tube 34 may be connected to the vent 32 by mating flanges, a coupling, or any other suitably sealing connector.

Referring now to FIGS. 3 through 5, preferably internal braces 38 are located inside the domed surface 26 of the seal cap 24. The internal braces 38 support the domed surface 26 to prevent it from collapsing. Additionally, the internal braces 38 provide support for lift lugs 40 which are attached to the domed surface 26 of the seal cap 24. Preferably four lifting lugs 40 are located on the seal cap 24 for handling and moving the seal cap 24 during transport to and from the containment building for the reactor pressure vessel 12.

Referring now to FIGS. 2, 3, 7 and 8, tubular guides 46 are attached to the seal cap 24 in complementary positions to the guide pins 18 on the reactor pressure vessel 12. The tubular guides 46 include a guide tube 48, which is sized for a close confirming fit with the guide pins 18, and a bracket 50 for attaching the guide tube 48 to the seal cap 24. It will be recognized by those skilled in the art from the present disclosure that the guide tubes 46 are provided in a position to align with the guide pins 18 on the reactor pressure vessel 12. It will be similarly recognized that the guides 46 may take other shapes, and need not be a fully enclosed tube, as shown Referring now to FIGS. 4 and 6, a seal 54a, 54b, is attached to the seal cap flange 28. As shown in FIG. 6, preferably the seal comprises two O-rings 54a, 54b located in annular grooves 56, 58 in the seal cap flange 28. However, it will be recognized by those skilled in the art from the present disclosure that other types of seals, such as a lip seal or flat seal, could be used, and other types of attachment means, such as an adhesive or a retainer, could be employed to attach the seal 54a, 54b to the reactor vessel seal flange 28. The seal 54a, 54b is located between the seal cap flange 28 and the upper flange 20 of the reactor pressure vessel 12. The seal 54a, 54b is compressed by hydrostatic pressure from water 15 in the water-filled refueling canal 14 acting on the surface 26 of the seal cap 24 as the reactor vessel 12 is drained.

Referring now to FIGS. 2 and 3, a lifting rig 60 is connected to the seal cap 24 for the lifting the seal cap 24 and placing it in position, with the seal cap flange 28 in alignment with the reactor vessel upper flange 20. The lifting rig 60 comprises a plurality of supports 62, 64, 66, which are attached to the seal cap 24. Preferably, the supports 62, 64, 66 are made of 6 inch Schedule 40 pipe and are connected to the seal cap 24 at three equally spaced locations. Cross-supports 70, 72, 74 are located between the support 62, 64, 66 to maintain them in position. A lifting hook 78 is connected to the lifting rig 60 so that it can be maneuvered by the crane 80, shown in FIG. 1, located above the reactor pressure vessel 12. The crane 80 is used to align the reactor vessel seal 24 with the reactor pressure vessel flange 20 and lower the reactor vessel seal 24 into position such that the guides 46 are in alignment with the guide pins 18.

Preferably, the components of the lifting rig 60 are disassembleable into transportable components which can be easily moved into and out of the containment building.

Referring now to FIGS. 1 and 2, a method of servicing the reactor pressure vessel 12 which is located beneath the water-filled refueling canal 14 without draining water 15 from the refueling canal 14 is provided. The method comprises the steps of unbolting the removable closure head 16 from the upper flange 20 of the reactor pressure vessel 12. The removable closure head 16 is then removed from the reactor pressure vessel 12 utilizing the crane 80. The internals of the reactor are then lifted from the reactor pressure vessel 12 and moved to a storage position, preferably in the water-filled refueling canal 14. The water 15 provides shielding from radiation from the internal portions of the reactor. The reactor vessel seal 10 is assembled in the containment building, with the seal cap 24 being attached to the supports 62, 64, 66 of the lifting rig 60. Preferably, the parts are assembled together with bolts and nuts (not shown), and the bolts are temporarily staked in position by flattening the thread near the nut with a punch after the bolt has been tightened. The lifting ring 78 is connected to the crane 80, the reactor vessel seal 10 is lowered into a position in alignment with flange 28 on the seal cap 24 aligned with the upper flange 20 of the reactor pressure vessel 12. The reactor vessel seal 10 is guided into position on the upper flange 20 via the guide pins 18 on the reactor pressure vessel 12 being aligned with and entering into the guides 46 located on the reactor vessel seal. Air trapped within the seal cap 24 is vented through the vent 32 and the vent tube 34 as the seal cap 24 is lowered.

Once the reactor vessel seal 10 is in position, with the reactor vessel seal flange 28 located on the upper flange 20 of the reactor pressure vessel 12, water is evacuated from the reactor pressure vessel 12. Water can be removed via a pump or a gravity drain, and can be stored for reuse, if desired. As water is removed from the reactor pressure vessel, the seal 54a, 54b located between the reactor vessel seal flange 28 and the upper flange 20 of the reactor vessel 12, is compressed by hydrostatic pressure from water 15 in the refueling canal 14 acting on the domed surface 26. With the hydraulic head of the water being 20-25 feet, this provides a sufficient force to seal the seal cap 24 by compressing the seal 54a, 54b to provide a water-tight joint between the reactor vessel seal 10 and the reactor pressure vessel 12. Once the water has been removed from the reactor pressure vessel, the inside of the pressure vessel can be inspected and/or serviced by remote means, such as remote cameras or remotely actuatable equipment for inspecting and servicing the inside of the reactor pressure vessel 12. This type of equipment is generally known to those skilled in the art, and accordingly further description is not believed necessary or limiting. With the interior of the reactor pressure vessel 12 being dry, it is also possible to anneal the reactor pressure vessel 12 to reduce the brittleness of the structure caused by radiation.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

I claim:

1. A reactor vessel seal for temporarily sealing a reactor pressure vessel from a water-filled refueling canal above the reactor pressure vessel, a removable closure head located on the reactor pressure vessel such that it seals against an upper flange of the reactor pressure vessel, and the reactor vessel seal being installed in place of the removable closure head for servicing the reactor vessel, the reactor vessel seal comprising:

a seal cap having a surface connected to a flange which is complementary to the upper flange of the reactor pressure vessel;

a seal located between the seal cap flange and the reactor pressure vessel flange; and a lifting rig connected to the seal cap for lifting the seal cap and placing it in position, with the seal cap flange in alignment with the reactor pressure vessel upper flange, such that the seal located between the seal cap flange and reactor vessel upper flange is compressed by hydrostatic pressure from water in the water-filled refueling canal acting on the surface of the seal cap as water in the reactor pressure vessel is evacuated.

2. The reactor vessel seal of claim 1 wherein the closure head is aligned by guide pins located on the reactor pressure vessel, the reactor vessel seal further including guides located on the seal cap in complementary positions to the guide pins on the reactor pressure vessel.

3. The reactor vessel seal of claim 1 wherein the seal comprises two O-rings located in annular grooves in the seal cap flange which are compressed against the reactor vessel cap flange in a water-tight manner by the hydrostatic pressure on the seal cap as the reactor vessel is drained.

4. The reactor vessel seal of claim 1 wherein the surface is domed, and further comprising internal braces located inside the domed surface.

5. The reactor vessel seal of claim 1 further comprising a vent attached to the surface of the seal cap.

6. The reactor vessel seal of claim 1 wherein the lifting rig comprises supports which are removably connected together, such that the lifting rig is disassembleable into transportable components.

7. A method of servicing a reactor pressure vessel located beneath a water-filled refueling canal without draining water from the refueling canal, comprising the steps of:

unbolting a removable closure head from an upper flange of the reactor pressure vessel and removing the removable closure head;

lowering a reactor vessel seal having a complementary flange to the upper flange of the closure head into a position in alignment with the upper flange of the reactor pressure vessel;

guiding the reactor vessel seal into position on the upper flange;

removing water from the reactor pressure vessel;

compressing a seal located between the reactor pressure vessel seal flange and the upper flange of the reactor vessel by hydrostatic pressure from water in the refueling canal; and servicing the reactor pressure vessel.

8. The method of claim 7 wherein guide pins are located on the reactor pressure vessel and complementary guide tubes are located on the reactor vessel seal, the method further comprising the step of aligning the guide tubes on the reactor vessel seal with the guide pins on the reactor pressure vessel as the reactor vessel seal is lowered into position.

9. The method of claim 7 further comprising the step of venting air from the reactor vessel seal through a vent opening which is connected to an air source.

10. The method of claim 9 further comprising the step of supplying air from the air source to the reactor pressure vessel through the vent opening as the water is removed from the reactor pressure vessel.

* * * * *